United States Patent [19]

Lermann et al.

[11] 4,171,895
[45] Oct. 23, 1979

[54] FOCUSING MEANS FOR PHOTOGRAPHIC APPARATUS

[75] Inventors: Peter Lermann, Narring; Dieter Engelsmann; Herbert Wilsch, both of Unterhaching, all of Fed. Rep. of Germany

[73] Assignee: AGFA-Gevaert, A.G., Leverkusen, Fed. Rep. of Germany

[21] Appl. No.: 856,572

[22] Filed: Dec. 1, 1977

[30] Foreign Application Priority Data

Dec. 14, 1976 [DE] Fed. Rep. of Germany ....... 2656656

[51] Int. Cl.$^2$ .............................................. G03B 3/00
[52] U.S. Cl. ..................................... 354/198; 354/195
[58] Field of Search ........................... 354/25, 195, 198

[56] References Cited

U.S. PATENT DOCUMENTS

| 3,713,371 | 1/1973 | Kurihara et al. | 354/25 |
| 3,947,860 | 3/1976 | Imai et al. | 354/195 |

Primary Examiner—John Gonzales
Attorney, Agent, or Firm—Peter K. Kontler

[57] ABSTRACT

A photographic apparatus wherein the objective is movable by a focusing mechanism in response to manual rotation of a ring from a starting position. A spring biases the ring to the starting position through the medium of a follower which carries a blocking lever for the focusing mechanism. The blocking lever is moved from the path of a reciprocable spring-biased toothed rack of the focusing mechanism prior to unlocking of the rack by a lever which is disengaged from the rack during that stage of movement of the ring from its starting position which follows retraction of the blocking lever from the path of the rack. The focusing mechanism has a certain amount of inertia so that it does not change the position of the objective during movement of the photographic apparatus between different positions in which the objective is or may be trained upon objects located at different distances from the apparatus.

12 Claims, 2 Drawing Figures

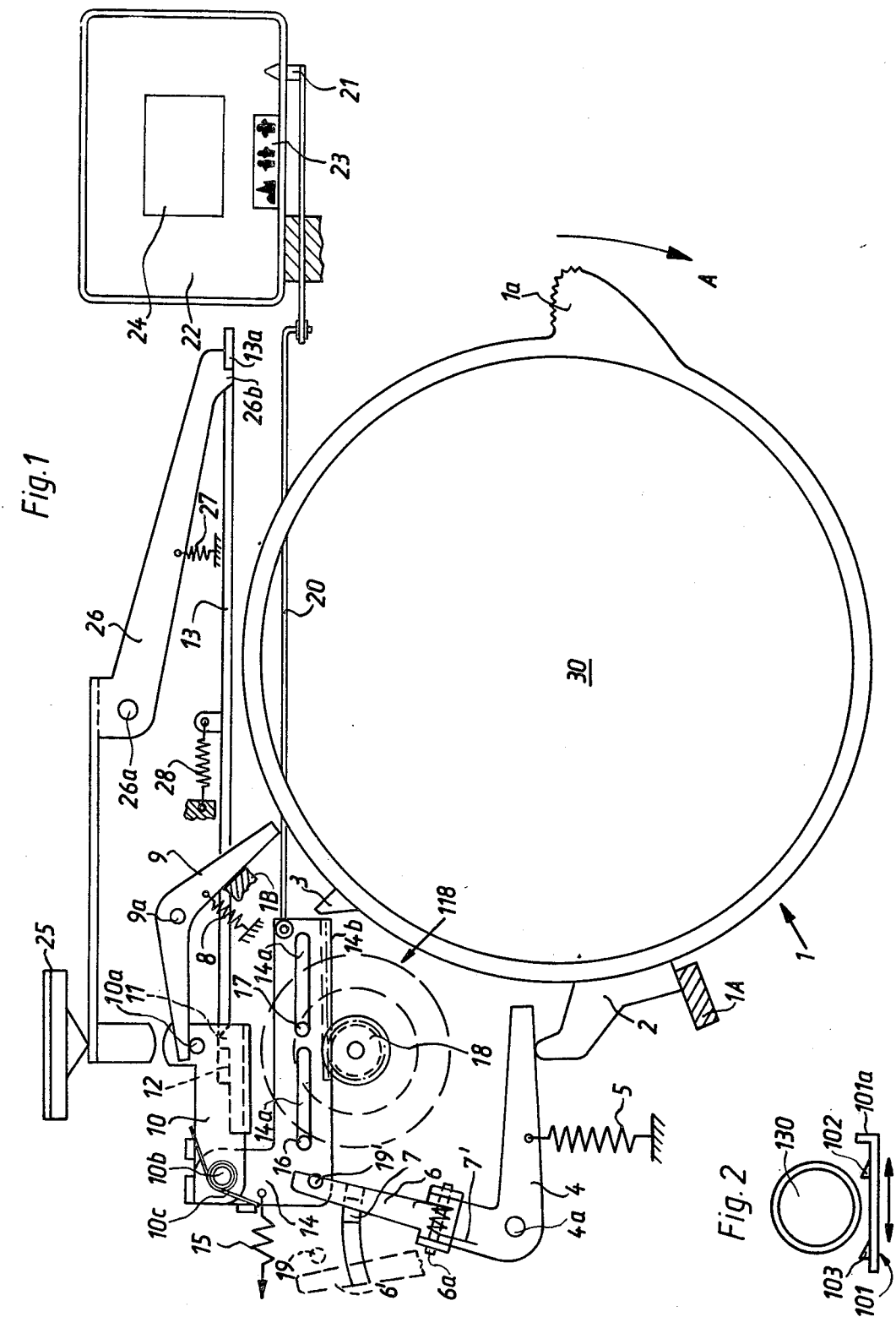

FOCUSING MEANS FOR PHOTOGRAPHIC APPARATUS

BACKGROUND OF THE INVENTION

The present invention relates to photographic apparatus in general, and more particularly to improvements in photographic apparatus having means for automatically or semiautomatically focusing the objective upon a selected object or scene. Still more particularly, the invention relates to improvements in photographic apparatus of the type wherein the optical system returns to a predetermined position (e.g., to a position in which the apparatus is set to make exposures with one boundary of the depth of field range at infinity) upon completion of the focusing operation.

A drawback of presently known photographic apparatus of the above outlined character is that the automatically selected setting of the optical system for the making of exposures within a selected depth of field range cannot be changed at the will of the operator prior to the making of that exposure which is to be made with the automatically selected position of focusing means. This reduces the versatility of such apparatus by preventing the user from making exposures with a depth of field setting which is not a result of automatic adjustment of the objective.

OBJECTS AND SUMMARY OF THE INVENTION

An object of the invention is to provide a photographic apparatus with novel and improved focusing means whose versatility exceeds the versatility of conventional focusing means.

Another object of the invention is to provide focusing means which enable the user of the photographic apparatus to change his or her mind regarding the selected depth of field range prior to the making of an exposure.

A further object of the invention is to provide a photographic apparatus which embodies the improved focusing means and enables the user to determine the position of the objective while observing the selected object or scene through the view finder.

An additional object of the invention is to provide a photographic apparatus which is constructed and assembled in such a way that the user knows, without observing any indicia, the condition of focusing means prior to deciding upon a selection of the depth of field range.

Another object of the invention is to provide novel and improved means for resetting the focusing means of a photographic apparatus.

Still another object of the invention is to provide a novel and improved operative connection between automatic or semiautomatic focusing means and manually operable actuating means therefor.

One feature of the invention resides in the provision of a photographic apparatus, e.g., a still camera, which comprises a picture taking objective movable between a plurality of positions (including a predetermined position) in which the objective focuses upon the photographic film images of objects located at different distances from the apparatus, focusing means connected to the objective and being operative to move the objective to that one of the plurality of positions which corresponds to the distance between the apparatus and a selected object (i.e., that object upon which the optical system of the objective is trained), means for normally holding the objective in the predetermined position through the medium of the focusing means, and a manually turnable ring, a reciprocable slide or other suitable actuating means which is operable to disengage the holding means from the focusing means and to thus enable the focusing means to move the objective from the predetermined position when such movement is warranted by the distance between the apparatus and the selected object.

The focusing means preferably includes a mechanism whose inertia is relatively high, i.e., which is not likely to change the position of the objective while the apparatus is swung or otherwise reoriented to place different objects into the field of view of a user looking through the view finder. A distance scale which is provided in or is at least observable in the view finder cooperates with an index which is coupled to the focusing means to indicate the position of the objective.

The holding means preferably comprises a strong spring which automatically returns the actuating means to the starting position and simultaneously moves the objective to the predetermined position through the medium of the focusing means when the actuating means is released by the user or the user relaxes the finger pressure upon the actuating means to an extent which enables the spring to move the actuating means back to starting position.

It is further within the purview of the invention to provide a locking device which holds the focusing means in a given position corresponding to the predetermined position of the objective and is disengaged from the focusing means by the actuating means during that stage of movement of actuating means which follows the (initial) stage of movement from starting position. During such initial stage, the actuating means disengages the holding means from the focusing means. The holding means preferably further comprises a follower which is biased against a motion transmitting portion of the actuating means by the aforementioned spring, and a blocking lever which is retracted from the path of movement of a component of the focusing means when the actuating means leaves the starting position.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic fragmentary partly front elevational and partly sectional view of a photographic apparatus which embodies one form of the invention; and FIG. 2 illustrates modified actuating means which includes a reciprocable slide.

DESCRIPTION OF THE PREFERRED EMBODIMENTS

Referring to FIG. 1 in detail, the reference character 1 denotes an annular actuating member or ring having a handgrip portion 1a adapted to be depressed by a finger to turn the actuating member in the direction which is indicated by arrow A. The actuating member 1 may be installed on the mount of the objective 30 so that its axis coincides with the axis of the optical system. This actuating member is provided with two motion transmitting portions or lugs 2 and 3 which are angularly offset with respect to each other, as considered in the circumferential direction of the objective 30. The lug 2 normally abuts against a fixed stop 1A on the camera body or on a stationary part of the mount for the objective. When the actuating member 1 is rotated in a clockwise direction from the starting position which is shown in FIG. 1, the lug 2 pivots a follower lever 4 which is fulcrumed at 4a and is biased clockwise, as viewed in FIG. 1, by a relatively strong helical spring 5. The bias of the spring 5 is sufficiently pronounced to insure that the follower lever 4 returns the lug 2 into abutment with the stop 1A as soon as the finger pressure upon the handgrip portion 1a is terminated or relaxed. The lug 2 is in permanent contact with the longer portion or arm of the follower lever 4; the shorter arm of this lever carries a blocking lever 6 which is turnably mounted on a pin 6a making a right angle with and crossing in space the axis of the fulcrum 4a for the follower lever 4. The blocking lever 6 is biased in a direction away from the observer of FIG. 1 by a torsion spring 7' which reacts against the shorter arm of the follower lever 4. This insures that the blocking lever 6 tracks the suitably configured face of a cam 7 which is mounted on the camera body or on a stationary part of the mount for the objective 30. The cam 7 has a lobe facing the observer of the drawing and its front face is configurated in such a way that the blocking lever 6 moves first toward and thereupon away from the observer of FIG. 1 when the follower lever 4 is caused to pivot in a counterclockwise direction. In the end position which is indicated by solid lines, the blocking lever 6 bears against a pin 19' which is movable in a direction to the left, as viewed in the drawing. When the blocking lever 6 reaches the broken-line position 6', it is again located in the path of movement of the pin 19' (this pin then assumes or can assume the broken-line position 19). The pin 19' is attached to or forms a protuberance of a toothed rack 14 which is biased by a helical spring 15 (in a direction to the left, as viewed in FIG. 1) and has two aligned slots 14a for stationary guide pins 16 and 17. The teeth 14b of the rack 14 mate with a gear 18 forming part of focusing means 118 (the exact details of the focusing means 118 form no part of the present invention). The rack 14 also forms part of the focusing means 118 and is articulately connected to a linkage 20 for an indicating member or pointer 21 which is movable with respect to a distance scale 23 below the field of view 24 of a view finder 22. A person looking through the view finder 22 can see the position of the end portion or tip of the pointer 21 and is thus apprised of the setting of the focusing means.

The motion transmitting portion or lug 3 of the actuating member 1 can pivot a locking or resting lever 9 which is fulcrumed at 9a and the right-hand arm of which normally engages a fixed stop 1B. The lug 3 reaches the right-hand arm of the locking lever 9 with a certain delay following the initial stage of pivoting of the follower lever 4 by the lug 2. The left-hand arm of the locking lever 9 engages a pin 10a on a further lever 10 which is fulcrumed at 10b and is biased (anticlockwise, as viewed in FIG. 1) by a torsion spring 10c. A helical spring 8 urges the lever 9 toward engagement with the stop 1B. When the locking lever 9 pivots the lever 10 by way of the pin 10a, the lever 10 disengages its protuberance or tooth 11 from a complementary protuberance or tooth 12 of a slidable release element 13 which is biased (in a direction to the left, as viewed in FIG. 1) by a helical spring 28. The pivot member 10b for the lever 10 is mounted on the rack 14.

The release element 13 can move under the action of the spring 28 in response to depression of a release button 25 which thereby pivots a lever 26. The lever 26 is fulcrumed at 26a and is biased clockwise by a helical spring 27 which normally maintains a tooth 26b of the lever 26 in the path of leftward movement of a complementary tooth 13a on the release element 13.

The operation is as follows:

When the user of the camera decides to turn the actuating member 1 in the direction indicated by arrow A, the lug 2 pivots the follower lever 4 against the opposition of the spring 5 and the lever 4 moves the blocking lever 6 which latter tracks the face of the cam 7 by pivoting under or against the action of the torsion spring 7'. The blocking lever 6 thereby moves away from the path of the pin 19' on the toothed rack 14. Shortly thereafter, the lug 3 of the actuating member 1 engages and pivots the locking lever 9 against the opposition of the spring 8. The locking lever 9 thereby disengages the protuberance 11 of the lever 10 from the protuberance 12 of the release element 13. Since the lever 10 is now disengaged from the release element 13, the spring 15 is free to pull the toothed rack 14 in a direction to the left. The rack 14 rotates the pinion 18 to move the objective 30 axially so that the position of the objective is properly related to the distance between the photographic apparatus and the selected object.

When the rack 14 is caused or permitted to assume its other (left-hand) end position, the pin 19' assumes the broken-line position 19 and is adjacent to the blocking lever 6 (in the position 6'). Thus, when the spring 5 is free to contract and to return the actuating member 1 to the starting position which is shown in FIG. 1, the blocking lever 6 can return the rack 14 to the illustrated (right-hand) end position by way of the pin 19'. The rack 14 thereby returns the pointer 21 to the illustrated position.

An exposure is normally made while the rack 14 dwells in a position other than the illustrated end position. The making of exposure necessitates depression of the button 25 which disengages the lever 26 from the release element 13 so that the latter is free to actuate the shutter, not shown.

The spring 5 is strong enough to immediately return the follower lever 4 and the actuating member 1 to the positions which are shown in the drawing as soon as the pressure upon the handgrip portion 1a is sufficiently relaxed or terminated. Thus, the spring 5 can overcome the bias of the spring 15 which latter tends to maintain the rack 14 in a position other than the illustrated end position. Such end position corresponds to a predetermined axial position of the objective 30; in the illustrated embodiment, the objective is focussed upon an object in infinity when the lug 2 abuts against the stop 1A.

The focusing means 118 can be actuated by hand when the actuating member 1 dwells in the starting position which is shown in FIG. 1. Thus, the user of the camera can make exposures with the objective 30 adjusted automatically by focusing means 118 upon rotation of the actuating member 1, or manually while the actuating member 1 dwells in the illustrated starting position. Moreover, the user need not make an exposure in order to return the focusing means 118 and the actuating member 1 to their respective starting positions; all that is necessary to effect such return movement is to relax or terminate finger pressure upon the handgrip portion 1a. The exposure is made in response to disengagement of the lever 26 from the release element 13, and such disengagement does not take place unless the button 25 is depressed. Thus, the user can change his or her mind and return the focusing means 118 to that (given) position which corresponds to the starting position of the actuating member 1 prior to the making of an exposure.

Another important advantage of the improved apparatus is that the user can always ascertain whether or not the focusing means 118 maintains the objective 30 in the predetermined position or in another position. All that the user has to do is to observe the position of the tip of the pointer 21 with reference to the distance scale 23.

The focusing means 118 may be similar to that disclosed in commonly owned U.S. Pat. No. 3,274,914 granted Sept. 27, 1966 to Biedermann et al. or in German Auslegeschrift No. 1,934,507 published July 2, 1970. It is preferred to employ focusing means whose inertia is sufficiently high to insure that the axial position of the objective 30 does not change while the user swings the photographic apparatus from a selected object to a different position in order to provide a different background or foreground for the selected object. For example, the user can train the objective 30 upon an object which does not exhibit pronounced density contrasts, and the user then moves the actuating member 1 from the starting position to enable the focusing means 118 to move the objective 30 to the corresponding position. The user thereupon changes the orientation of the camera so that the selected object can be imaged together with one or more objects which exhibit more pronounced contrasts. During such change in orientation, the focusing means 118 maintains the objective 30 in the previously selected position. The tip of the pointer 21 indicates the selected position of the objective 30.

Furthermore, the user can proceed as follows: If the scene which is to be photographed does not include a central object which exhibits pronounced density contrasts, the objective can be trained upon an object which does not exhibit pronounced contrasts, and the focusing means 118 will automatically select the optimum position for the objective.

The purpose of the cam 7 is to insure that the blocking lever 6 is moved out of the path of movement of the rack 14 under the action of the spring 15 not later than when the rack 14 is free to leave the illustrated (given) position corresponding to predetermined position of the objective 30. Moreover, the lever 6 serves to return the rack 14 to such given position when the spring 5 is free to return the follower lever 4 into engagement with the stop 1A, i.e., when the spring 5 is free to move the actuating member 1 back to the starting position. The blocking lever 6 preferably returns the rack 14 to the position of FIG. 1 before the lug 2 reaches the stop 1A. The cam 7 thereupon pivots the lever 6 away from the pin 19'. The construction of the holding means including the follower lever 4, spring 5, blocking lever 6 and cam 7 can be modified, for example, by connecting the cam 7 with the actuating member 1 so that the cam moves against or is disengaged from the blocking lever 6 during certain stages of movement of actuating member 1 to or from the starting position.

The rack 14 is actually held in the given position of FIG. 1 by the locking lever 9 through the medium of the lever 10 and teeth 11 and 12. Thus, the spring 15 is free to move the rack 14 from the position which is shown in FIG. 1 only when the locking lever 9 pivots the lever 10 to the extent which is necessary to disengage the tooth 11 from the tooth 12; the lever 10 is then free to share the movement of the rack 14 under the action of the spring 15. This takes place after the blocking lever 6 has been moved out of the way by the cam 7, i.e., after the blocking lever 6 has been moved out of the path of movement of the pin 19'.

The annular actuating member 1 can be replaced with a reciprocable actuating member or slide 101 (see FIG. 2) which is adjacent to the objective 130 and includes a handgrip portion 101a and two spaced-apart projections 102, 103 corresponding to the motion transmitting lugs 2 and 3 of FIG. 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. In a photographic apparatus having release means, the combination of an objective which is movable between a plurality of positions, including a predetermined position, in which positions the objective focuses upon the photographic film images of objects located at different distances from the apparatus; focusing means connected with and operative to move said objective to that one of said positions which corresponds to the distance between the apparatus and a selected object; means for normally holding said objective against movement from said predetermined position through the medium of said focusing means; and actuating means operable to disengage said holding means from said focusing means and to thus enable said focusing means to move said objective from said predetermined position when such movement is warranted by the distance between the apparatus and the selected object, said actuating means being movable independently of said release means between a starting position in which said holding means is free to maintain said objective in said predetermined position and a second position in which said holding means is disengaged from said focusing means.

2. The combination of claim 1, further comprising view finder means, a distance scale observable in said view finder means, and mobile indicating means connected with said focusing means and having a portion adjacent said scale to pinpoint the position of said objective.

3. The combination of claim 1, wherein said actuating means comprises a rotary annular member which is coaxial with said objective.

4. The combination of claim 1, wherein said actuating means comprises a manually reciprocable member adjacent said objective.

5. The combination of claim 1, wherein said actuating means is movable by hand from said starting position and includes motion transmitting means, said holding means including follower means located in the path of movement of said motion transmitting means and means for biasing said follower means against said motion transmitting means to thereby urge said actuating means to said starting position, said holding means further comprising means for blocking said focusing means in the starting position of said actuating means and said follower means being arranged to disengage said blocking means from said focusing means on movement of said actuating means from said starting position.

6. The combination of claim 5, wherein said blocking means includes means for returning said focusing means to a given position corresponding to said predetermined position of said objective while said biasing means moves said actuating means back to said starting position.

7. The combination of claim 5, wherein said biasing means includes a spring.

8. The combination of claim 7, wherein said follower means includes a lever connected with said blocking means and having a portion abutting against said motion transmitting means, said spring being arranged to maintain said portion of said lever in engagement with said motion transmitting means.

9. In a photographic apparatus, the combination of an objective which is movable between a plurality of positions, including a predetermined position, in which positions the objective focuses upon the photographic film images of objects located at different distances from the apparatus; focusing means connected with and operative to move said objective to that one of said positions which corresponds to the distance between the apparatus and a selected object; means for normally holding said objective against movement from said predetermined position through the medium of said focusing means; actuating means operable to disengage said holding means from said focusing means and to thus enable said focusing means to move said objective from said predetermined position when such movement is warranted by the distance between the apparatus and the selected object, said actuating means being movable by hand from a starting position corresponding to said predetermined position of said objective and including first and second motion transmitting means, said holding means including follower means located in the path of movement of said first motion transmitting means and means for biasing said follower means against said first motion transmitting means to thereby urge said actuating means to said starting position, said holding means further comprising means for blocking said focusing means in the starting position of said actuating means and said follower means being arranged to disengage said blocking means from said focusing means on movement of said actuating means from said starting position; and means for locking said focusing means in a given position corresponding to said predetermined position of said objective, said second motion transmitting means being operative to disengage said locking means from said focusing means on movement of said actuating means from said starting position.

10. The combination of claim 9, wherein said first mentioned motion transmitting means is arranged to disengage said blocking means from said focusing means during a first stage of movement of said actuating means from said starting position and said second motion transmitting means is arranged to disengage said locking means from said focusing means during the next-following stage of movement of said actuating means from said starting position.

11. In a photographic apparatus, the combination of an objective which is movable between a plurality of positions, including a predetermined position, in which positions the objective focuses upon the photographic film images of objects located at different distances from the apparatus; focusing means connected with and operative to move said objective to that one of said positions which corresponds to the distance between the apparatus and a selected object; means for normally holding said objective against movement from said predetermined position through the medium of said focusing means; actuating means operable to disengage said holding means from said focusing means and to thus enable said focusing means to move said objective from said predetermined position when such movement is warranted by the distance between the apparatus and the selected object, said actuating means being movable by hand from a starting position corresponding to said predetermined position of said objective and including motion transmitting means, said holding means including follower means located in the path of movement of said motion transmitting means and a spring for biasing said follower means against said motion transmitting means to thereby urge said actuating means to said starting position, said holding means further comprising means for blocking said focusing means in the starting position of said actuating means and said follower means being arranged to disengage said blocking means from said focusing means on movement of said actuating means from said starting position, said follower means including a first lever connected with said blocking means and having a portion abutting against said motion transmitting means, said spring being arranged to maintain said portion of said lever in engagement with said motion transmitting means and said blocking means including a second lever pivoted to said first lever; and cam means positioned to disengage said second lever from said focusing means on pivoting of said first lever by said motion transmitting means.

12. In a photographic apparatus, the combination of an objective which is movable between a plurality of positions, including a predetermined position, in which positions the objective focuses upon the photographic film images of objects located at different distances from the apparatus; focusing means connected with and operative to move said objective to that one of said positions which corresponds to the distance between the apparatus and a selected object; means for normally holding said objective against movement from said predetermined position through the medium of said focusing means; actuating means operable to disengage said holding means from said focusing means and to thus enable said focusing means to move said objective from said predetermined position when such movement is warranted by the distance between the apparatus and the selected object, said actuating means being movable by hand from a starting position corresponding to said predetermined position of said objective and including motion transmitting means, said holding means including follower means located in the path of movement of said motion transmitting means and means for biasing said follower means against said motion transmitting means to thereby urge said actuating means to said starting position, said holding means further comprising means for blocking said focusing means in the starting position of said actuating means and said follower means being arranged to disengage said blocking means from said focusing means on movement of said actuating means from said starting position; and means for urging said focusing means from a given position corresponding to said predetermined position of said objective with a force which is less pronounced than the force of said biasing means so that the latter overcomes the force of said urging means and returns said focusing means to said given position when said actuating means is released by the hand of the operator for movement to said starting position under the action of said biasing means.

* * * * *